United States Patent
McAllister et al.

[11] Patent Number: 5,397,971
[45] Date of Patent: Mar. 14, 1995

[54] BI-POLAR DISK TORQUING SYSTEM FOR A DISK DRIVE TO FREE STUCK TRANSDUCERS

[75] Inventors: Jeffrey S. McAllister; Boyd N. Shelton, both of Boise, Id.; Henricus M. van Hout, PP Heeze, Netherlands

[73] Assignee: Hewlett-Packard Company, Palo Alto, Calif.

[21] Appl. No.: 274,570

[22] Filed: Jul. 13, 1994

Related U.S. Application Data

[63] Continuation of Ser. No. 895,495, Jun. 8, 1992, abandoned.

[51] Int. Cl.⁶ .......................... H02P 6/02; G11B 21/02
[52] U.S. Cl. ..................... 318/254; 318/281; 318/282; 369/44.27; 360/73.03; 360/75; 360/98.07
[58] Field of Search ............... 318/138, 254, 256, 257, 318/280, 281, 282, 430, 431, 439; 369/44.27; 360/71, 73.01, 73.02, 73.03, 74.1, 75, 98.01, 98.07

[56] References Cited
U.S. PATENT DOCUMENTS

| | | | |
|---|---|---|---|
| 4,507,590 | 3/1985 | Miyazaki | 318/254 |
| 4,839,754 | 6/1989 | Gami et al. | 360/73.01 |
| 4,912,378 | 3/1990 | Vukosavic | 318/254 |
| 4,922,169 | 5/1990 | Freeman | 318/254 |
| 4,970,610 | 11/1990 | Knappe | 360/75 |
| 5,017,845 | 5/1991 | Carobolante et al. | 318/138 |
| 5,057,753 | 10/1991 | Leuthold et al. | 318/254 |
| 5,128,913 | 7/1992 | Fennema et al. | 369/44.27 |
| 5,202,614 | 4/1993 | Peters et al. | 318/254 |
| 5,202,616 | 4/1993 | Peters | 318/254 |
| 5,202,616 | 4/1993 | Peters | 318/254 |
| 5,208,712 | 5/1993 | Hatch et al. | 360/98.01 |

*Primary Examiner*—Bentsu Ro
*Attorney, Agent, or Firm*—E. F. Oberheim

[57] ABSTRACT

A multiple pole, multiple phase, sensorless DC disk spindle motor in a disk drive is powered by direct current which is commutated among the motor phases from a DC power supply to start the motor and to rotate the disks at constant speed in a predetermined direction whenever the disk drive is in use. When the motor is prevented from rotating by the stiction bond of one or more transducers which have adhered to the disks, the direct current is reversibly commutated among the motor phases near the resonant frequency, a predetermined number of times, to produce substantially sinusoidal, bi-polar motor torques to achieve torque amplification to break the stiction bonds. Following the last of the predetermined number of reversible commutations of direct current, direct current commutation is initiated among the motor phases to rotate the motor and the disks in the desired direction at constant speed.

11 Claims, 8 Drawing Sheets

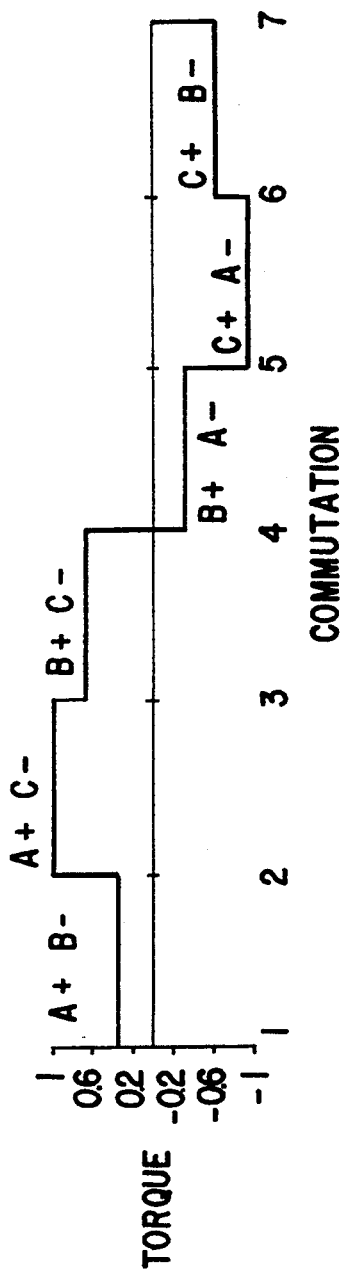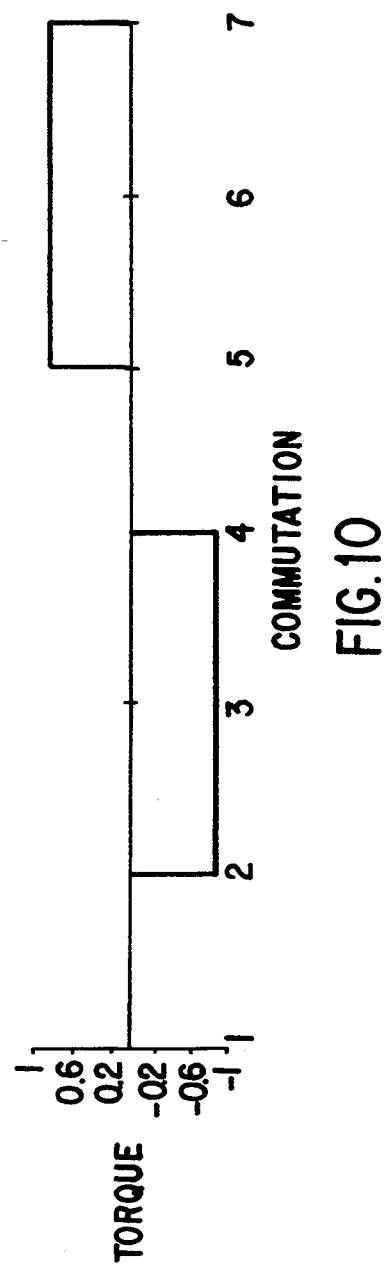

5,397,971

BI-POLAR DISK TORQUING SYSTEM FOR A DISK DRIVE TO FREE STUCK TRANSDUCERS

RELATED REFERENCE TO RELATED APPLICATION

This is a continuation of application Ser. No. 07/895,495, filed on Jun. 8, 1992, now abandoned.

FIELD OF THE INVENTION

This invention relates generally to disk drives and, in particular, to disk drives having a provision for freeing disks for rotation from transducers which have adhered to respective surfaces of the disks.

BACKGROUND OF THE INVENTION

In a disk drive, the adherence of a transducer to the surface of a disk with which it is in contact is a condition which is well known and is commonly referred to as "stiction". Various techniques have been proposed to avoid this condition and to deal with the condition when it exists. Efforts to eliminate the condition have included disk texturing, the application of a lubricant to a disk surface and the elimination of materials in the drive which exhibit outgassing contributing to the stiction condition. When the stiction condition exists, it is usually dealt with by applying brute force to separate the transducers and the disks, in a degree which does not damage the transducer suspension. If this does not free the disks for rotation, the disk drive is inoperative.

Such prior art techniques, other than brute force, usually produce uncertain results. The use of brute force, as practiced in the prior art, requires either disk spindle motors or transducer actuator motors of sufficient power to break the stiction bond. As the disk drives get smaller, the actuator motors are significantly reduced in power. In drives in the one-to-two inch form factor size range, actuator power is lacking for breaking stiction bonds.

Attention is therefore being directed to the disk spindle motor which drives the disk assembly or stack. Here also, however, in small drives, the motor is lacking in power to apply torque of sufficient magnitude, within the mechanical force limits of transducer suspensions, to break the stiction bond, using conventional motor starting techniques. In general, this also requires a torque constant (K) larger than is sometimes necessary or allowable for motor running speed requirements because of size requirements or restrictions. Winding resistance is increased because of the requirement for increased winding turns to produce the required torque. This is undesirable because of the increase in the electrical power requirement for normal operation. Moreover, in smaller disk drives, even with redesign as suggested, this brute force torque requirement may not be achievable.

One more recent teaching of a technique for breaking the stiction bond is described in U.S. Pat. No. 4,970,610, La Verne F. Knappe, inventor, entitled Magnetic Disk Drive Start Procedure For Starting Reaction Torque Amplification. Knappe addresses the problem using a brushless, direct current, three phase, delta wound disk spindle motor including Hall sensors. The motor is powered by coupling unidirectional direct current pulses thereto at a frequency which is stated to be the resonant frequency of the "stuck system". The stuck system includes the disk assembly, the actuator and any transducers that are stuck. A motion sensor is required to sense when the disk rotational motion is in the direction of desired rotation, the positive direction, to provide timing for the application of the unidirectional current pulses.

SUMMARY OF THE INVENTION

Improvement is provided in freeing the disk or disks in the disk assembly from the transducers, according to this invention, by mechanically resonating the disk/transducer/motor rotor assembly, the rotating assembly, at its mechanical resonant frequency. This is accomplished by coupling to the disk assembly a substantially sinusoidal, bi-polar mechanical torque of substantially the resonant frequency of the rotating assembly, including the rotor of the disk spindle motor, the disk assembly, the actuator and any transducers adhering to the disks, rather than just a unidirectional torque in the direction of rotation, as taught by Knappe. This substantially doubles the torque over that obtainable when the disk spindle motor is only pulsed in one direction.

The disk drive disclosed herein comprises a rotatably mounted disk stack comprising two disks and a rotary actuator having an armstack supporting three magnetic heads, each adjacent a respective surface of the disks.

A brushless, multiple pole, multiple phase, sensorless, DC motor is employed to drive the disk assembly. To start the drive, bi-polar DC power is commutated from a DC power supply to the motor phases at a frequency to drive the motor at a constant speed whenever the drive is in use. When, upon the commutation of bi-polar DC power to the motor to start the drive, the starting torque fails to initiate rotation, due to the adherence of one or more of the transducers to the disks, the motor is thereafter excited by bi-polar pulses of direct current at substantially the resonant frequency of the rotating assembly.

Where only one or two disks are in the disk assembly, it may be functionally acceptable to select as the resonant frequency, the frequency of the rotating assembly with all of the transducers adhering to the disks, or in the alternative, say two out of three transducers. It is preferred, however, since only three or four transducers are involved in the two disk stack, to predetermine the resonant frequency of the disk stack/rotary actuator assembly for the individual cases where one, or two, or three, etc., transducers adhere to the disks and to commutate bi-polar disk motor excitation successively at these individual frequencies until disk rotation in the desired direction is achieved, or to shut down the drive in the event that at the conclusion of the starting effort there is no disk rotation.

The bi-polar excitation at the individual frequencies is achieved by commutating among the motor windings a predetermined number of commutation cycles each. Upon completion of the predetermined number of cycles, the last phase is held on while the back EMF is sensed to detect if rotation has occurred. Since the motor is of sensorless design, it is not known whether this phase will be high torque or low torque. If rotation is not sensed, then another set of the same number of cycles will be repeated after which the next phase will be held high. This will be continued until rotation is achieved.

In the best mode for practicing the invention, the motor comprises a number of poles in which the number of stator poles is odd. The motor rotor comprises a spot magnetized annular ring, encircling the stator, having an even number of equally circumferentially spaced permanent magnet poles each producing a magnetic field linking an adjacent stator pole. The ratio of the number of stator poles to the number of magnetized rotor poles is three-to-four and the preferred number of commutated bi-polar excitation cycles, at each different resonant frequency of the rotating system, is equal to a multiple of twice the number of motor phases plus one. The ultimate goal is to apply a burst of resonant frequencies of sufficient length to produce maximum displacement amplification. Enough bursts should be applied such that at the end of the bursts each motor phase polarity is held on to determine if normal motor spin-up occurs.

BRIEF DESCRIPTION OF THE DRAWINGS

The invention will be better understood upon reference to the following specification when considered in conjunction with the accompanying drawings, in which:

FIGS. 9 and 10 are plots of the motor torque function in each commutation step of one commutation cycle with the rotor retained or locked with respect to the stator in respective angular positions designated POS X and POS Y.

BEST MODE FOR PRACTICING THE INVENTION

Figure 1:
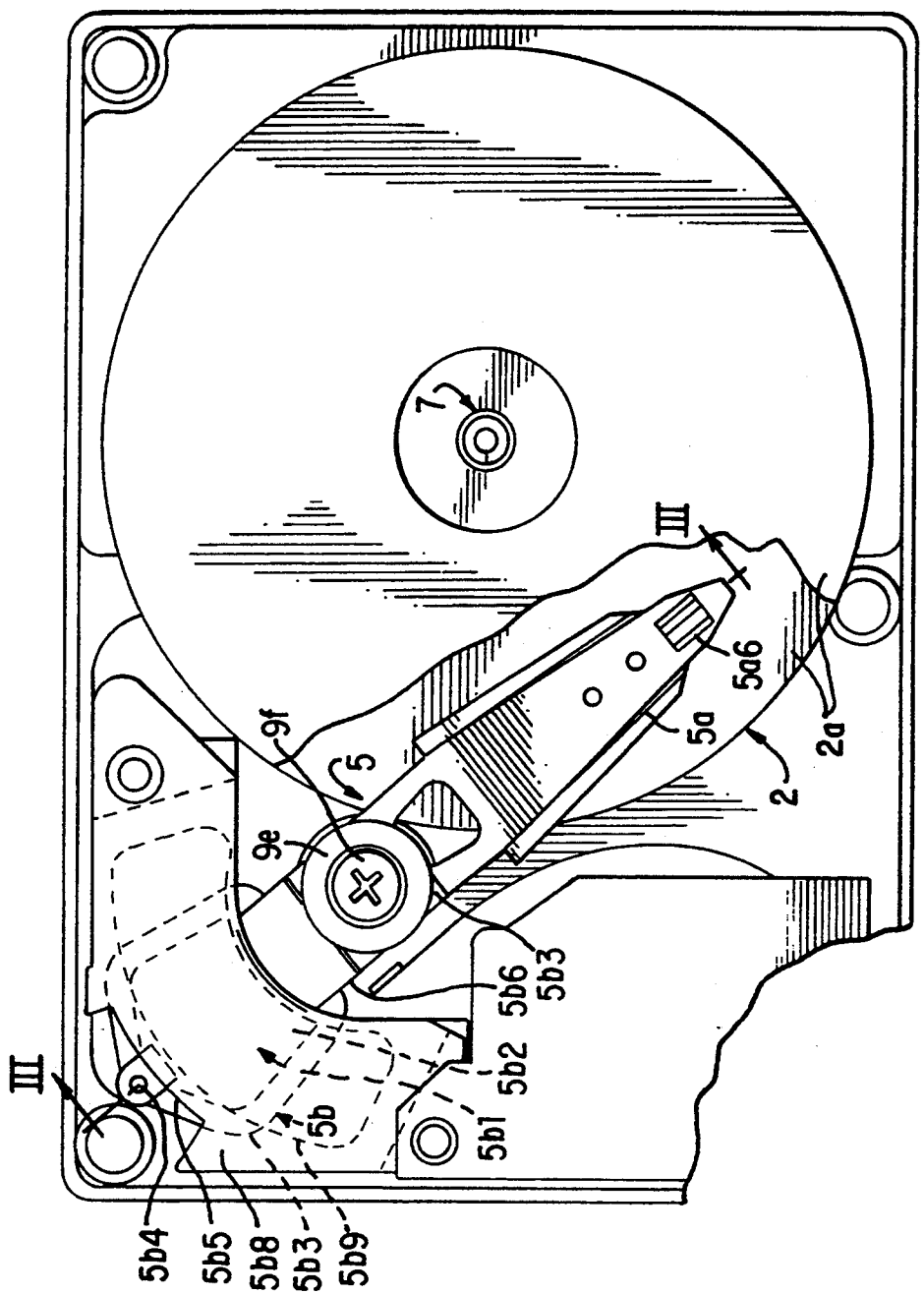
FIG. 1 is a plan view of a rotary actuator disk drive.
Figure 2:
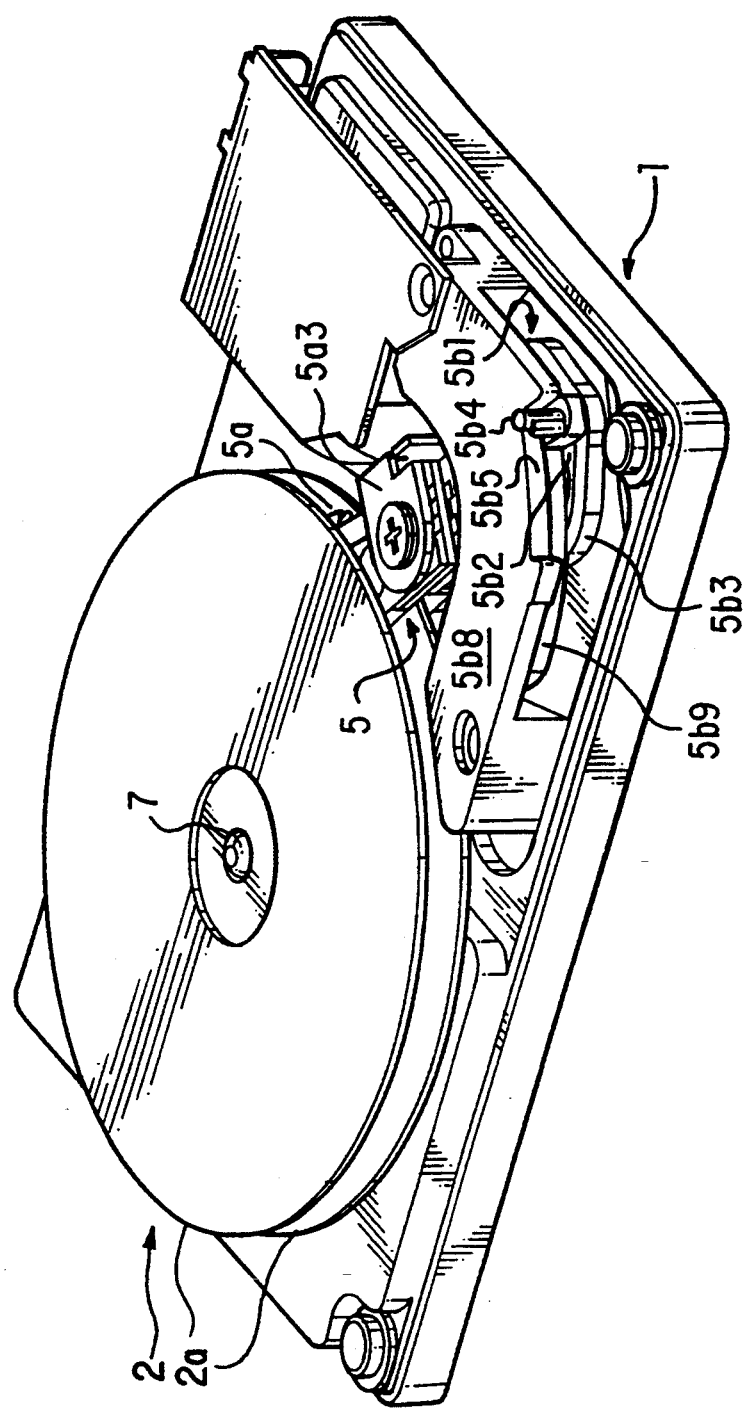
FIG. 2 is an isometric view of the disk drive of FIG. 1.

FIGS. 1 through 4 of the drawings illustrate a rotary actuator type of disk drive embodying the best mode for practicing this invention. The disk drive comprises a base or support 1 upon which a disk stack 2 and a rotary actuator assembly 5 are rotatably mounted and sealed, within a housing, not shown. During operation, the disk stack 2 of one or more individual disks 2a, is rotated about the axis 7 of a disk spindle by an electric motor 17, FIG. 4, at a predetermined constant speed, as is well known. The motor is secured to the base 1.

Figure 3:
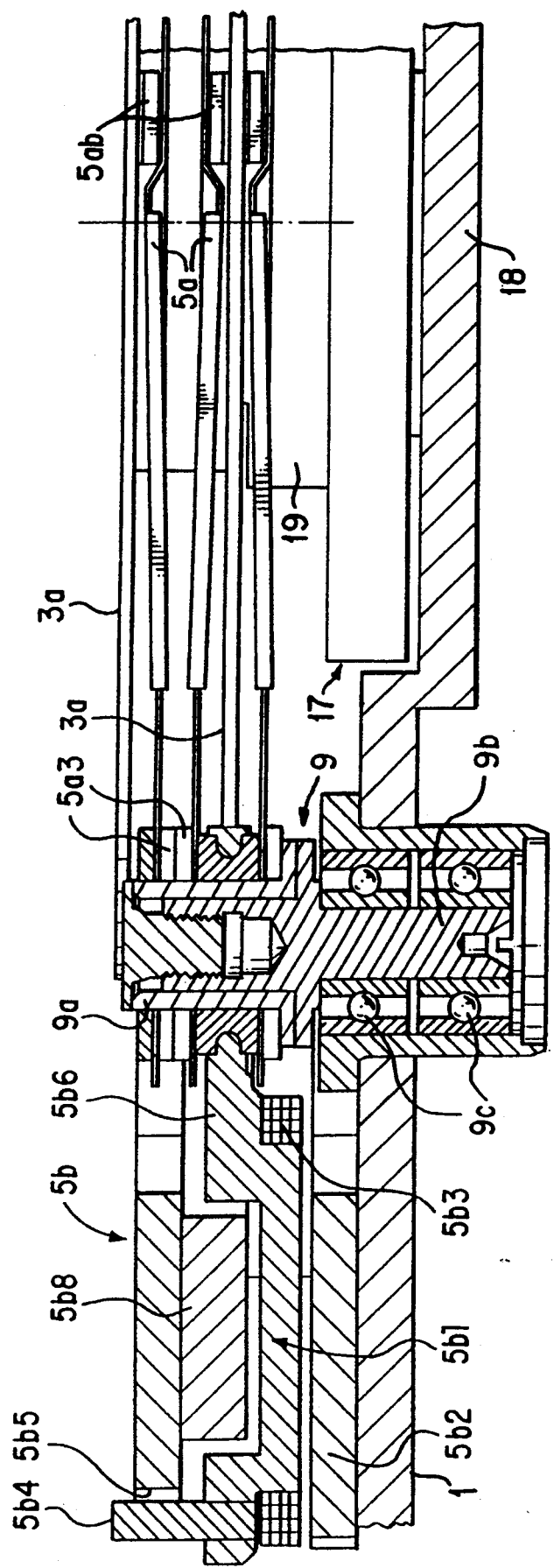
FIG. 3 is an enlarged sectional view of the disk drive assembly taken on the line III—III of FIG. 1.

The rotary actuator assembly 5 is assembled on a tubular member 9a, FIG. 3, which is a coaxial part of a two-piece spindle 9, the other part 9b of which is journaled in a coaxial bearing assembly 9c secured in the base 1. The rotary actuator assembly 5 comprises one or more load beams 5a, constituting an armstack, and a voice coil motor drive 5b therefor. A moving part 5b1 of the voice coil motor 5b has a coil support or housing 5b2 for a voice coil 5b3. An extension arm 5b6 of the coil support or housing 5b2 is stacked with the load beam or beams 5a, in a predetermined sequence, on the tubular member 9a and secured thereto by swaging of the tubular member. The distal ends of the load beams 5a each mount a transducer 5a6.

Angular movement of the rotary actuator assembly is limited by a crash stop structure comprising a pin 5b4 of magnetizable material anchored in the coil support 5b2. The pin 5b4 projects adjacent an arcuate edge or recess 5b5 in an upper magnet plate 5b8, comprising part of the stator structure of the voice coil motor 5b, in which position the pin 5b4 engages the ends of the arcuate recess 5b5, to provide mechanical limits to bidirectional angular movement of the rotary actuator assembly 5. The upper magnet plate 5b8 supports a permanent magnet 5b9, forming part of the voice coil motor 5b. The pin 5b4 also functions as magnetic latch in one limit.

The extension arm 5b6 of the coil support or housing 5b2, mounts a metallic insert 5b7 at its end. This metallic insert is also provided with an opening or hole therethrough of a diameter to provide a slip fit over the cylindrical portion of the tubular hub 9a. The thicknesses of the reinforcing plates 5a3 and of the metallic insert 5b7 are related to the axial spacing of the disks and properly position the load beams and the magnetic heads between the disks.

The disk stack assembly 2 comprises a circular hub 3, preferably of metal. The circular hub 3 is of inverted cup shaped configuration in cross section, comprising a flat base portion 3a and an integral depending annulus 3b, which latter, with the base, defines a cup-shaped cylindrical cavity 3c. The upper face of the base 3a and the bottom end face of the annulus 3b define axially spaced surfaces to which respective disks 2a are bonded, using a two part epoxy, for example.

Figure 4:
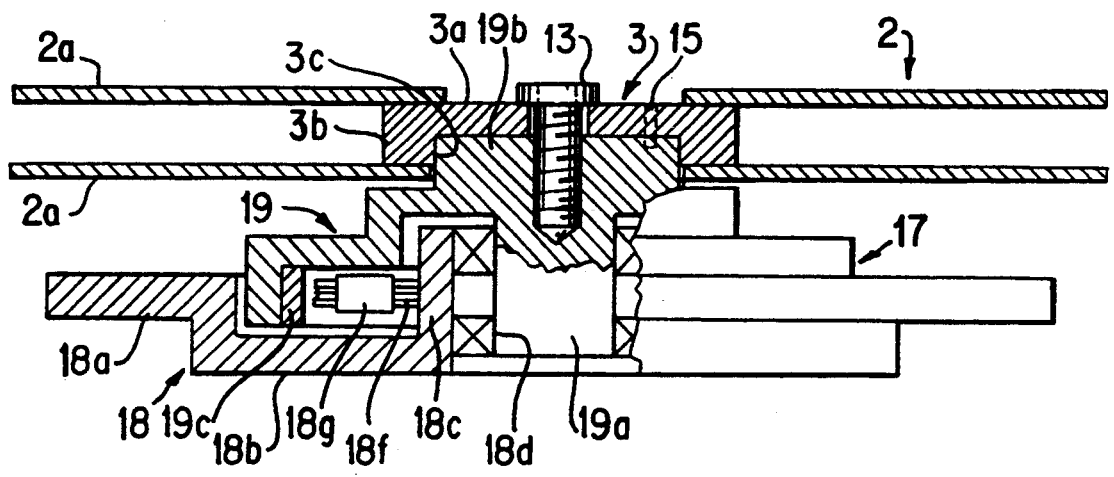
FIG. 4 is an enlarged sectional view of the disk stack and the disk drive motor taken in a plane including the disk drive spin axis 7.

The disk assembly 2 is driven by a motor 17 comprising a stator 18 and a rotor 19, as seen in FIG. 4. The stator 18 comprises a stator plate 18a having a base portion 18b, forming part of a base 1 for the disk drive, or secured to such base. The disk drive housing is not shown in the interest of simplicity. A tubular bearing housing 18c is an integral part of the stator base portion 18b. A motor spindle or shaft 19a is a concentric, integral part of the motor rotor 19 and is journaled in an axially spaced bearing pair 18d in the tubular bearing housing 18c. The stator 18 of the motor 17 comprises a magnetic core 18e, FIG. 5, having a plurality of equally, circumferentially spaced, salient poles 18f. The rotor 19 is umbrella shaped, FIG. 4, and peripherally carries a ring magnet 19c which circles the tips of the salient poles 18f. The ring magnet 19c is spot magnetized, defining equally circumferentially spaced rotor poles. The motor 17 functions as a brushless DC motor which operates at a constant speed. The type of motor employed is known as a sensorless DC disk spindle motor, in that it lacks a Hall sensor. In the preferred embodiment, the motor 17 comprises nine salient stator poles 18f, each with a winding 18g, and the rotor ring magnet 19c comprises 12 equally, circumferentially spaced magnetic poles, alternately magnetized N-S, S-N, in a radial direction. The rotor 19 is preferably of carbon steel, or of a magnetizable stainless steel, and functions as the outer flux return path of the motor.

The upper end 19b of the spindle or shaft 19a is cylindrical and is a slip fit within the cup-shaped cylindrical cavity 3c of the circular hub 3, which concentrically positions the disk stack 2 with respect to the axis of the motor rotor 19. Integration is achieved by means of a fastener, such as a screw or a bolt 13, centrally disposed of the assembly, clearing through the center of the base 3a of the hub 3 and axially threading into the cylindrical end 19b of the motor shaft 19a.

The resonant frequency of the system when one or more heads are stuck to the disks is a function of the angular moment of inertia of the rotatable system and the spring rate of the stuck system. The rotatable system includes the disk stack 2, the motor rotor 19, and the fastener 13. The spring rate is determined by the stiffness of the load beams 5a, gimbals 5a7, actuator arm bearings 9c, and all other mechanical components in the loop between transducers 5a6 and disks 2a. The stiffness or spring rate will vary depending on how many transducers are stuck. In some instances, a single resonant frequency corresponding to all transducers stuck may be employed and found to be acceptable for bi-polar motor excitation. This represents the worst case resonant frequency. Of course, a resonant frequency for a condition of less than all transducers adhering to the disks may also be an acceptable alternative. In either of these circumstances, the resonant frequency remains fixed. This approach minimizes complexity and may provide a basis for functional bidirectional excitation of the disk/actuator assembly, i.e., the rotating assembly.

According to the Best Mode for practicing this invention, however, with the disk drive shown, it is preferred to calculate individual mechanical resonant frequencies for each rotary actuator configuration for one, or two, or three transducers adhering to the disks and to commutate cycles of bi-polar motor winding excitation at the different frequencies, individually and successively, to initiate disk stack rotation. If the disk fails to rotate after the last of the excitation frequencies is applied, excitation is terminated.

Figure 6:
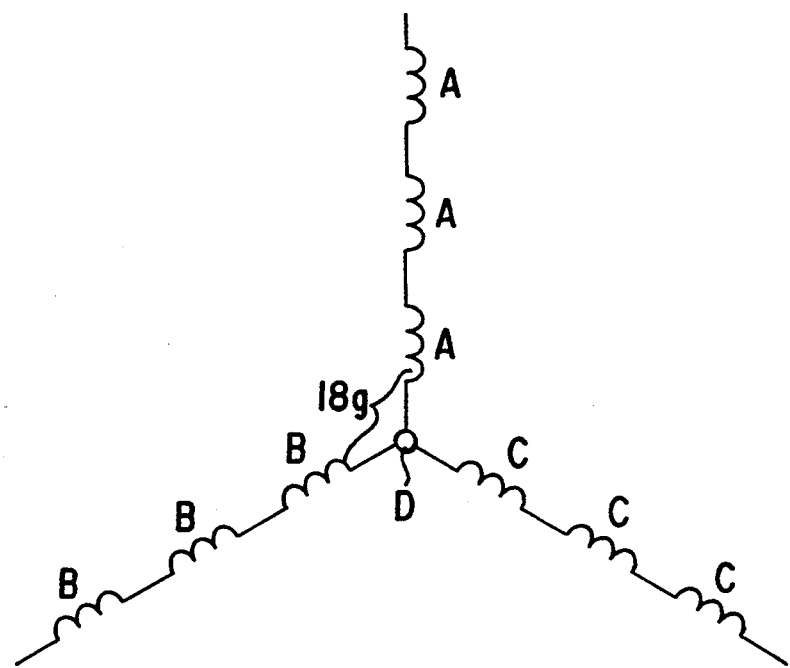
FIG. 6 diagrammatically illustrates the star connection of the motor stator windings.
Figure 5:
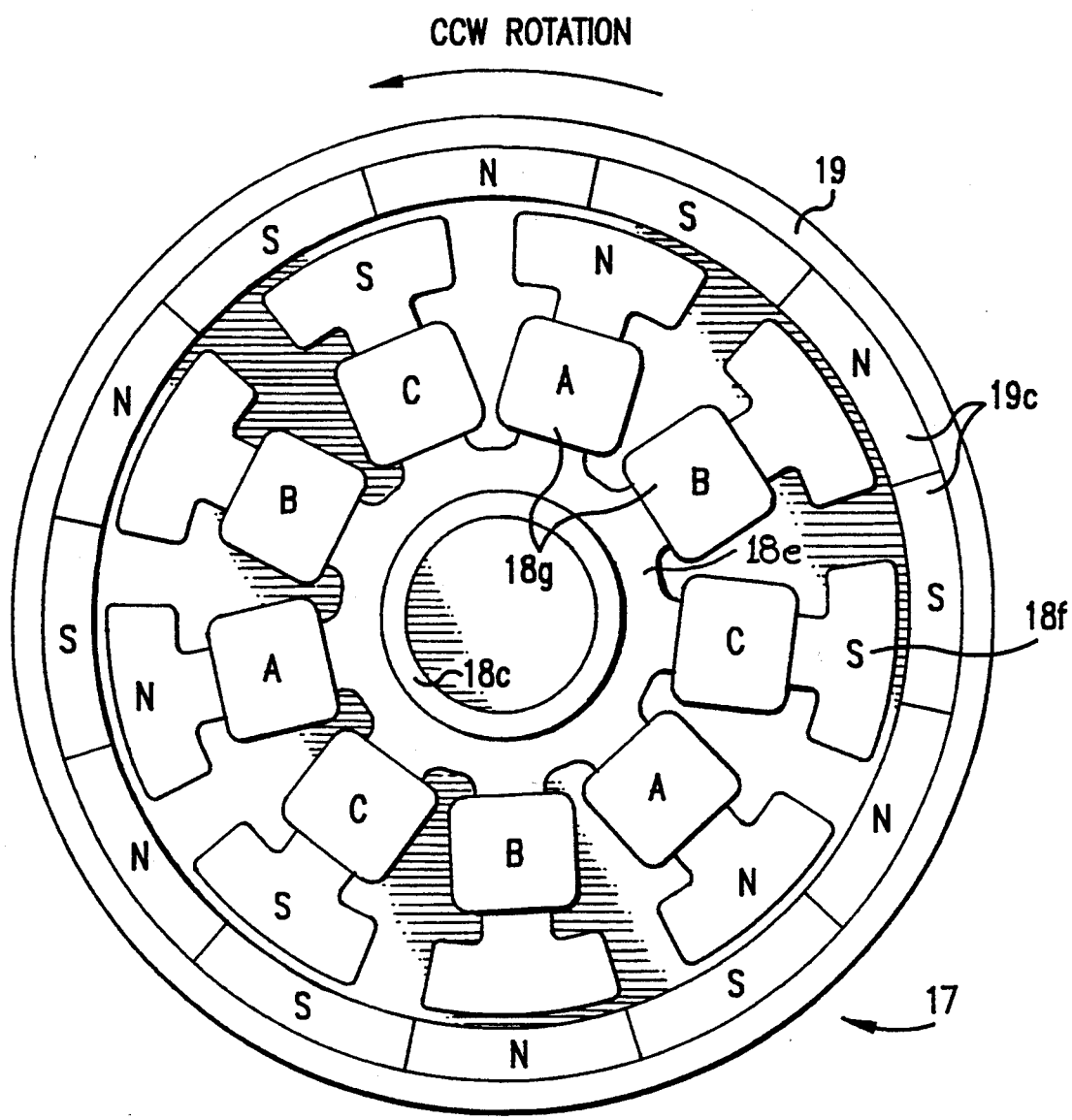
FIG. 5 is a schematic drawing showing the planform layout of the stator and rotor poles of the disk drive motor in one specific angular position.

The disk drive system comprises a sensorless (no Hall sensor), brushless DC motor, FIG. 5, having star connected stator windings, FIG. 6. As seen in FIG. 5 the disk drive motor comprises 9 stator poles 18f and 12 rotor poles 19c. A winding 18g is disposed on each stator pole 18f. The windings are divided into groups of three windings, the windings in each of the three groups being designated as A, B and C. The windings bearing corresponding letters A or B or C are connected in series, FIG. 6, each series group constituting one winding branch of a star connection, as seen in FIG. 6.

The rotor 19 concentrically, rotatably supports the permanent magnetic ring 19c which is spot magnetizied in alternate polarities in 12 equally circumferentially spaced positions. The rotor 19 provides the flux return path. Magnetization is oppositely poled in a radial direction in adjacent rotor poles. Only that magnetic pole polarity adjacent the stator pole tips is shown in the drawing. The magnetic polarity of the stator poles for the windings 18g, lettered A to C, is shown. In this illustration, the rotor poles 19c occupy an angular position relative to the stator poles 18f, providing maximum rotor torque for that polarity, A+, C− of DC voltage applied to the winding branches A and C, which together represent one of the three phases of the motor 17.

There are six bi-polar motor phases. The bi-polar motor phases in one commutation cycle are identified in Table I below:

TABLE I

| | Phase 1 | Phase 2 | Phase 3 | Phase 4 | Phase 5 | Phase 6 |
|---|---|---|---|---|---|---|
| | A+ | A+ | B+ | B+ | C+ | C+ |
| | B− | C− | C− | A− | A− | B− |
| Zero | C | B | A | C | B | A |

TABLE I-continued

| | Phase 1 | Phase 2 | Phase 3 | Phase 4 | Phase 5 | Phase 6 |
|---|---|---|---|---|---|---|
| | A+ | A+ | B+ | B+ | C+ | C+ |
| | B− | C− | C− | A− | A− | B− |
| Crossing | | | | | | |

Lacking a Hall sensor, the motor phase selection for excitation is random. Thus, in the absence of commutation the voltages applied to the motor may be applied to a motor phase in which the motor torque is zero or near zero, regardless of the polarity of the voltage, by reason of the physical disposition of the motor stator poles in relation to the permanent magnetic poles on the rotor ring, or in some other motor phase where the motor torque is less than maximum, in which case the disk motor may fail to start. By commutating the bi-polar voltage among the six phases of motor torque as noted above, a motor phase is found at which motor torque is maximum and, in the circumstance where there is no problem with excessive transducer adherence to a disk, the disk stack will spin up.

Figure 7:
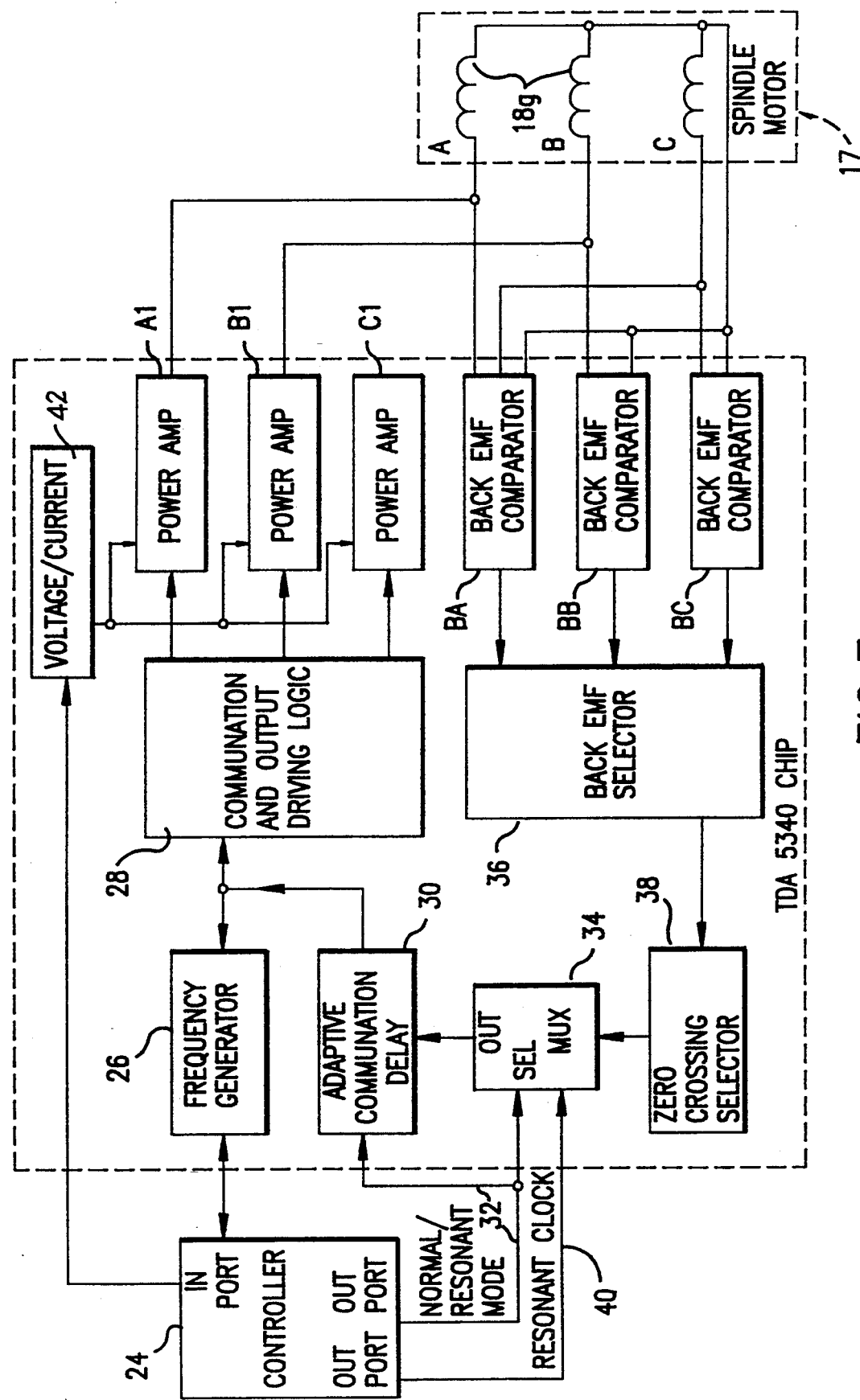
FIG. 7 is a block diagram of the disk motor control system.

The disk spindle motor is coupled to and controlled by a control system, FIG. 7, which comprises a controller 24, which may be the drive controller of the disk drive. The function of the system under the control of the controller is:
1. to initiate disk start-up,
2. if the disk fails to rotate, to extend the commutation cycles successively at the different frequencies
3. to recognize the onset of disk rotation and its direction, and
4. to effect disk rotation in the desired direction at the proper RPM.

The control functions are implemented employing an IC chip which is commercially available, and which is identified as TDA 5340, available from Phillips International, Eindhoven, Netherlands. This chip comprises a frequency generator 26 which is controlled by the IC chip 24 to indicate the commutation frequency, which is six times the resonant frequency. The frequency generator 26 monitors a signal which goes to a commutation and driving logic circuit 28 which latter commutates the voltages, A+ C−, etc., of the respective phases of Table I, via the individual power amplifiers A1, B1, C1, to the respective motor windings 18g, lettered A, B, and C, at the frequencies indicted by the frequency generator 26 and at the sequential maximum fixed voltage values and voltage polarities. An adaptive commutation and delay circuit 30 is controlled by the controller 24, in a normal/resonant mode, to time commutation for start up and for normal running via a circuit 32, to initiate and time the disk start-up and running timing for the commutation circuit 28. The normal or resonant mode circuit 32 also controls a multiplexer 34 having an output coupled to the adaptive commutation delay circuit 30 for commutation timing in the normal resonant mode, circuit 32. In the normal mode, the zero crossing selector 38 provides a commutation signal to the adaptive commutation delay circuit 30. In the resonant mode, zero crossings are received and a resonant clock signal on circuit 40 from the controller 24 provides a commutation signal to the adaptive commutation delay circuit 30. Respective back EMF comparators, BA, BB and BC, couple the back EMF voltages of the respective windings 18f, A, B and C, to a back EMF selector 36, the output of which is coupled to a zero crossing selector 38 which also goes to the multiplexer 34. The input to the zero crossing selector, developed via the back EMF comparators BA, BB and BC, and the back EMF selector 36, identifies the winding branch A or B or C of the back EMF voltage, and the polarity of the voltage. If the back EMF voltage remains fixed, i.e., no zero crossing, the rotor is stationary. At any point in the commutation cycle, during a starting attempt, that a zero crossing is detected, there is an output from the zero crossing selector 38 to initiate motor excitation to free the disk and the normal mode function for start-up continues. In the absence of zero crossings, however, sensed from the frequency generator 26 by the controller 24, the controller produces an output signal to the multiplexer 34 and a resonant clock frequency equal to six times the resonant frequency being excited, on circuit 40 to the multiplexer which resets the adaptive commutation delay circuit 30 to time commutation to the requirements of the disk motor excitation for the disk freeing function. At this point the system initiates the commutation of bi-polar voltages, at the respective frequencies, in sequence, among the winding phases, to free the disk. A voltage/current circuit 42 controlled by the controller 24 in response to the frequency generator circuit 26, controls the power amplifiers A1, B1, C1 to couple maximum power to the motor windings during the resonant mode of operation.

Figure 8:
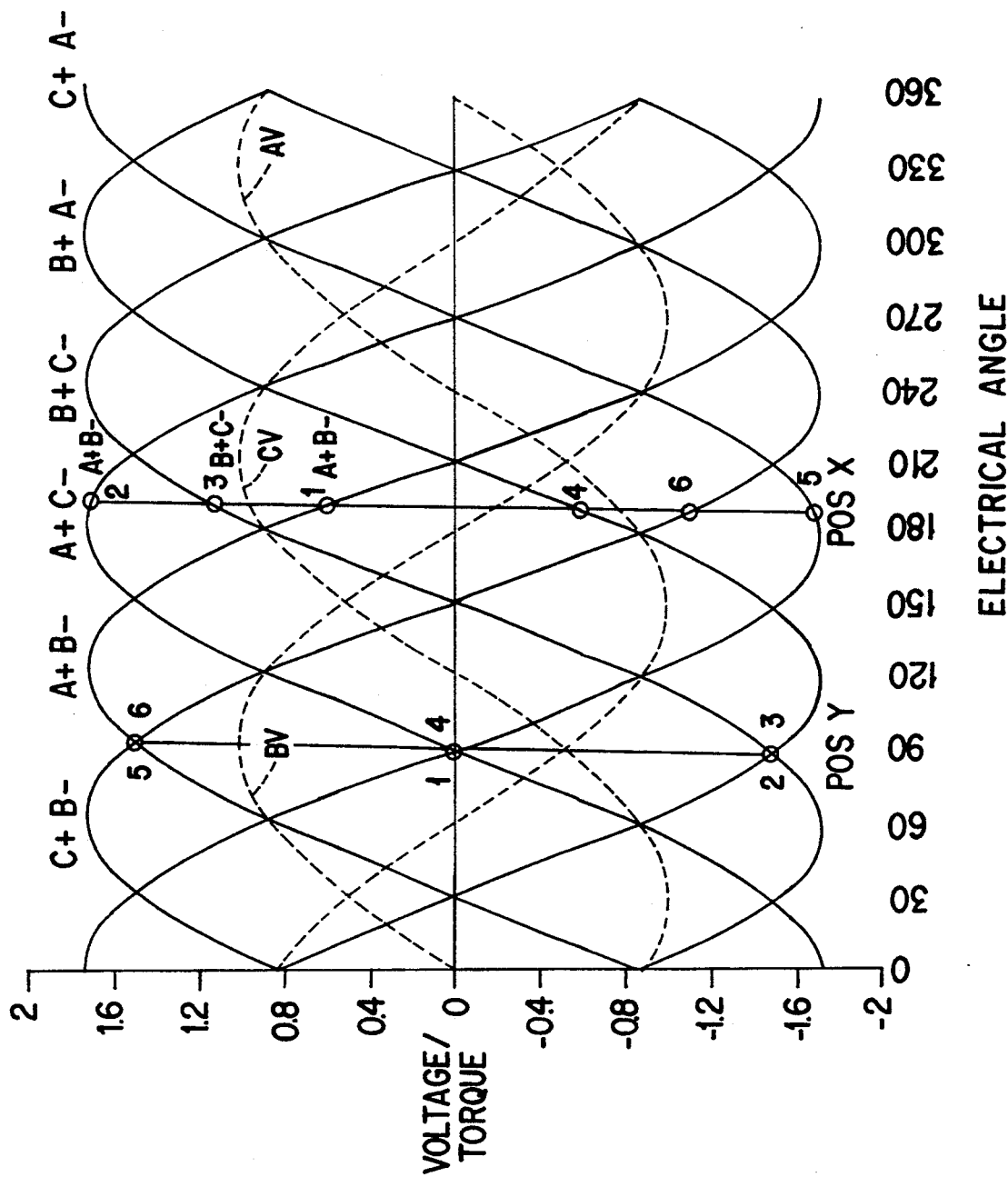
FIG. 8 is a plot ideally depicting the back EMF and the motor torque as a function of the electrical angle.

The system will be better understood by reference to FIGS. 8, 9, and 10. FIG. 8 plots ideally configured back EMF voltages, the dotted curves, and the motor torque, the solid curves, and FIGS. 9 and 10 depict the torque functions of the motor for two different positions of the rotor with respect to the stator, one position is referenced POS X and the other position is referenced POS Y, representing, respectively, positions X and Y of the motor rotor with respect to the motor stator. Position, POS X, in FIG. 8 represents a position of the motor rotor with respect to the stator, near that presented in FIG. 5, for that voltage polarity A+ C— of excitation at that instant. Referring to the torque function of FIG. 9 for locked rotor position POS X, it will be seen that for the value of the motor torque for a specific polarity of DC voltage on the successive phases of the motor, the values of the torque of the motor vary in a stepped sinusoidal manner. Thus, the application of a voltage of polarity A+ B— produces a value of motor torque 1, in FIG. 9, and plotted in position 1 in FIG. 8, in a positive direction, which represents the desired direction of rotation of the motor for example. The application of a voltage A+ C— to the terminals of the windings A and C of the motor, produces the maximum motor torque value 2, as seen in FIG. 8. The bi-polar voltage B+ C— results in a voltage torque value 3, as seen in FIG. 8. The negative torque values proceed in a similar manner and are identified 4, 5 and 6 in FIG. 8.

Referring now to FIG. 10, depicting the torque function of the motor when in a locked rotor condition in position POS Y, it is seen that the motor torque is zero in both bi-polar voltage excitation phases A+ C—, and C+ A—, and that the torque levels are identical in commutation phases 2 and 3 B+ C—, B+ A— respectively in a negative sense and commutation phases 5 and 6 C+ B—, respectively in a positive sense. The bi-polar voltages at each of these locations is identified.

Referring again to FIG. 8, it will be seen that during the interval of the application of the bi-polar voltage A+ C—, that the back EMF voltage BV at the point where it intersects the POS X line is slightly negative. Similarly, when the bi-polar voltage A+ B— is applied the back EMF voltage CV intersection with the POS X line is not zero if the rotor begins to rotate in a forward direction and is a positive value. Similar considerations apply with respect to the locked rotor position at position Y.

For the locked rotor position POS X, it will be seen that the application of the bi-polar voltage A+ C— to the winding branches A and C of the motor results in maximum motor torque 2 at which location the motor torque will cause disk spin in the normal mode, absent stuck heads. If at such a motor torque, disk stack spin up fails, successive such random applications of motor torque as commutation proceeds at a resonant frequency through the phases may cause the disk to break free of the transducers which have adhered to the disk surfaces, at which time disk rotation is initiated. If disk rotation occurs in the presence of torques at either torque values 2 or 5, as seen in FIG. 8, POS X, the direction of disk rotation is determined after the next zero crossing by the polarity of the back EMF voltage BV. Similar considerations apply with respect to POS Y.

What is claimed is:

1. A disk drive comprising:
   a hard disk assembly having at least one hard disk;
   a multi-phase motor having a stator with stator poles and a rotor with rotor poles for rotating said hard disk assembly;
   movable transducer actuator means mounting at least one transducer for movement to different radial positions with respect to a surface of said disk and for moving said transducer to a park position in contact with said surface of said disk, said at least one transducer sometimes adhering to said surface of said disk in said park position and hereby joining said moveable transducer actuator means to said at least one hard disk of said hard disk assembly, said movable transducer actuator means and said hard disk assembly when joined having a resonant frequency;
   a DC power supply, and
   motor control means for commutating bi-polar voltages at substantially said resonant frequency from said DC power supply to successive phases of said multi-phase motor in a number of successive commutation cycles equal to a multiple of twice the number of motor phases plus one, to produce a bi-directional motor torque and bi-directional hard disk assembly torque for breaking adhesion of said at least one transducer to said at least one hard disk so that said hard disk assembly is rotated by said multi-phase motor.

2. The invention according to claim 1, in which:
   said bi-directional motor torque is a stepped, substantially sinusoidal torque function.

3. A method for freeing for rotation a disk driven by a multiple stator pole, multi-phase DC motor in a disk drive when a transducer has stuck to a surface of said disk, forming a stuck transducer/disk assembly having a resonant frequency, comprising the steps of:
   commutating bi-polar DC power of a first frequency at a first approximation of said resonant frequency to successive phases of said multi-phase motor for a predetermined number of cycles to start said motor beginning with a random motor phase;
   multi-phase motor for zero crossings;

commutating bi-polar DC power of a second frequency at a second approximation of said resonant frequency when at the end of said predetermined number of cycles at said first frequency no back EMF voltage zero crossing is detected;

commutating said bi-polar DC power at said second frequency to successive phases of said multi-phase motor for a predetermined number of commutation cycles, and monitoring the back EMF voltage of said multi-phase motor for zero crossings to determine if said multi-phase motor is rotating.

4. The method according to claim 3, further comprising the step of:

utilizing the polarity of said back EMF voltage after a zero crossing to indicate the direction of rotation of said multi-phase DC motor.

5. The method according to claim 4, in which:

said predetermined number of commutation cycles is equal to a multiple of twice the number of motor phases plus one.

6. A motor control circuit for energizing a multi-phase motor for rotating a hard disk of a disk drive when a transducer of a transducer actuator has adhered to a surface of said hard disk, joining said transducer actuator and said hard disk in a transducer actuator/hard disk assembly having a resonant frequency, said motor control circuit comprising:

a. a sensorless multi-phase motor, b. circuit means for commutating bi-polar voltages from a DC power supply to successive phases of said sensorless multi-phase motor for a predetermined number of successive commutation cycles equal to a multiple of twice the number of motor phases plus one motor phase for producing bi-directional motor torquers at substantially the resonant frequency of said transducer actuator/hard disk assembly, c. means for maintaining excitation of said plus one motor phase for a predetermined time interval, and d. means for sensing the zero crossing of the back EMF voltage of said sensorless multi-phase motor during said predetermined time interval for indicating whether said motor is rotating.

7. The motor control circuit according to claim 6, in which:

a. said bi-directional motor torque is a stepped, substantially sinusoidal torque function.

8. A motor control circuit for energizing a multi-phase motor for rotating a hard disk of a disk drive when a transducer of a transducer actuator has adhered to a surface of said hard disk, joining said transducer actuator and said hard disk in a transducer actuator/hard disk assembly having a resonant frequency, said motor control circuit comprising:

a. circuit means for commutating bi-polar voltages at a first frequency which is a first approximation of said resonant frequency, from a DC power supply to successive motor phases in each commutation cycle, for a predetermined number of successive commutation cycles equal to a multiple of twice the number of motor phases plus one to produce a bi-directional motor torque which is a stepped, substantially sinusoidal motor torque at substantially the resonant frequency of said transducer actuator/hard assembly, in which excitation of the final motor phase is held on while the back EMF of said motor is sensed to detect if rotation is produced; and b. means responsive to the back EMF voltage of said multi-phase motor for changing the frequency of said bi-polar voltage to a second frequency which is a second approximation of said resonant frequency, for a second predetermined number of cycles, to attempt to increase said bi-directional motor torque if said hard disk fails to rotate when energized with said bi-polar voltage at said first frequency.

9. A control system for freeing for rotation a disk assembly in a head/disk assembly of a disk drive when a transducer of the head/disk assembly is stuck to a surface of a disk, forming a stuck head/disk assembly, comprising:

a. a sensorless multi-phase motor forming a part of said disk assembly for rotating said disk assembly;

b. a motor control circuit for commutating bi-polar voltages at a selected frequency to successive phases of said motor for a predetermined number of successive commutation cycles equal to a multiple of twice the number of phases of said motor, and, after the last motor phase of the last commutation cycle of said predetermined number of commutation cycles, for applying and for maintaining for a time interval a voltage to a succeeding motor phase;

c. means for sensing zero crossings of the back EMF voltage of said motor, at least during said interval of time, for indicating whether there is motor rotation, and d. means responsive to said means for sensing zero crossings, in the event no zero crossings are sensed, for initiating a second commutation of bi-polar voltages at a selected frequency to successive phases of said motor for a second said predetermined number of successive commutation cycles beginning with that motor phase which follows said succeeding motor phase in the succession of motor phases.

10. A control system for freeing for rotation a disk assembly in a head/disk assembly of a disk drive when a transducer of the head/disk assembly is stuck to a surface of a disk, forming a stuck head/disk assembly, comprising:

a. a sensorless multi-phase motor forming part of said disk assembly for rotating said disk assembly;

b. a motor control circuit for commutating bi-polar voltages at a selected frequency to successive phases of said motor, starting at random with a first phase of said motor to initiate a predetermined number of successive commutation cycles equal to a multiple of twice the number of phases of said motor, and, after the last motor phase of the last commutation cycle of said predetermined number of commutation cycles, for applying and for maintaining for a time interval a voltage to said first phase of said motor, said first phase of said motor following the last motor phase of the last commutation cycle of said predetermined number of commutation cycles;

c. means for sensing zero crossings of the back EMF voltage of said motor, at least during said interval of time, for indicating whether there is motor rotation, and d. means responsive to said means for sensing zero crossings, in the event no zero crossings are sensed, for initiating a second commutation of bi-polar voltages at a selected frequency to successive phases of said motor for a second said predetermined number of successive commutation cycles plus one motor phase, beginning with that phase of said motor which follows said first phase of said motor.

11. A control system for freeing for rotation a disk assembly in a head/disk assembly of a disk drive when a transducer of the head/disk assembly is stuck to a surface of a disk, forming a stuck head/disk assembly, comprising:
   a. a sensorless multi-phase motor forming part of said disk assembly for rotating said disk assembly;
   b. a motor control circuit for commutating bi-polar voltages at a selected frequency to successive phases of said motor, starting at random with a first phase of said motor to initiate a predetermined number of successive commutation cycles equal to a multiple of twice the number of phases of said motor, and, after the last motor phase of the last commutation cycle of said predetermined number of commutation cycles, for applying and for maintaining for a time interval a voltage to said first phase of said motor, which first phase follows the last motor phase of the last commutation cycle of said predetermined number of commutation cycles;
   c. means for sensing zero crossings of the back EMF voltage of said motor, at least during said interval of time, for indicating whether there is motor rotation;
   d. means for recycling for a predetermined number of times said predetermined number of successive commutation cycles after each sensing for zero crossings when no zero crossings are found;
   e. means for sensing the polarity of the back EMF voltage after sensing of a zero crossing for determining the direction of motor rotation, and
   f. means responsive to a predetermined polarity of said back EMF voltage for commutating bi-polar voltages to rotate said motor.

* * * * *